United States Patent
Ramond et al.

(10) Patent No.: US 7,726,269 B2
(45) Date of Patent: Jun. 1, 2010

(54) GLOW PLUG WITH INTEGRATED PRESSURE SENSOR

(75) Inventors: Alain Ramond, Merville (FR); Sandro Goretti, Ruberia (IT)

(73) Assignees: Siemens VDO Automotive, Toulouse (FR); Federal-Mogul Ignition Srl, Capri (IT)

( * ) Notice: Subject to any disclaimer, the term of this patent is extended or adjusted under 35 U.S.C. 154(b) by 73 days.

(21) Appl. No.: 11/911,236

(22) PCT Filed: Mar. 30, 2006

(86) PCT No.: PCT/FR2006/000688

§ 371 (c)(1),
(2), (4) Date: Feb. 8, 2008

(87) PCT Pub. No.: WO2006/108938

PCT Pub. Date: Oct. 19, 2006

(65) Prior Publication Data

US 2008/0216786 A1 Sep. 11, 2008

(30) Foreign Application Priority Data

Apr. 12, 2005 (FR) .................................. 05 03606

(51) Int. Cl.
*F02B 1/12* (2006.01)
*F02B 5/02* (2006.01)
(52) U.S. Cl. ................ 123/143 R; 123/435; 73/114.16; 73/114.18; 73/114.19
(58) Field of Classification Search ................. 123/143, 123/435, 143 R; 73/114.16, 114.18, 114.19
See application file for complete search history.

(56) References Cited

U.S. PATENT DOCUMENTS

| 4,549,430 | A | * | 10/1985 | Dobler et al. ............. 73/114.19 |
| 5,739,626 | A | * | 4/1998 | Kojima et al. ............... 310/360 |
| 5,998,765 | A | | 12/1999 | Mizuno et al. |
| 6,539,787 | B1 | * | 4/2003 | Murai et al. .............. 73/114.21 |
| 6,823,738 | B1 | * | 11/2004 | Wlodarczyk et al. .......... 73/705 |
| 6,938,491 | B2 | * | 9/2005 | Clark et al. .................... 73/753 |
| 7,207,214 | B1 | * | 4/2007 | Wlodarczyk ............. 73/114.19 |
| 2002/0043898 | A1 | | 4/2002 | Sebastian et al. |

(Continued)

FOREIGN PATENT DOCUMENTS

CN 1190812 8/1998

(Continued)

OTHER PUBLICATIONS

International Search Report of PCT/FR2006/000688, date of mailing Jul. 10, 2006.

Primary Examiner—Stephen K Cronin
Assistant Examiner—J. Page Hufty
(74) Attorney, Agent, or Firm—Young & Thompson

(57) ABSTRACT

A glow plug includes: a tubular body (2) having at one of its ends a plug head as well as a fixing zone including elements (12, 13) for being fixed in a bore, an arm (4) mounted on the body (2) of the plug at the end opposite to the plug head, and a pressure sensor (8) sealingly insulated from the corresponding cylinder. The arm (4) is fixed to an elastically deformable tubular zone (17) designed to project inside the cylinder. The pressure sensor (8) is mounted between the arm (4) and a support component (18) fixed inside the tubular body (2).

18 Claims, 1 Drawing Sheet

U.S. PATENT DOCUMENTS

2003/0234835 A1 * 12/2003 Torii et al. .................... 347/68

FOREIGN PATENT DOCUMENTS

| DE | 196 80 912 | 4/2001 |
| DE | 103 46 330 | 5/2005 |
| EP | 1 096 141 | 5/2001 |
| WO | WO 9709567 | 3/1997 |

* cited by examiner

GLOW PLUG WITH INTEGRATED PRESSURE SENSOR

FIELD OF THE INVENTION

The present invention concerns a glow plug with an integrated pressure sensor.

BACKGROUND OF THE INVENTION

In an internal combustion engine, in particular a diesel type engine, each cylinder has a glow plug for heating the interior of the corresponding combustion chamber, in particular when starting the engine. This glow plug is disposed in a threaded bore that passes through the cylinder head of the engine. This glow plug therefore includes a threaded body adapted to be fitted into the corresponding bore of the cylinder head and a finger in which a preheating electrode is housed.

SUMMARY OF THE INVENTION

It is also known to integrate a pressure sensor into such a glow plug. In effect, it has been noticed that a knowledge of the value of the pressure inside each cylinder made it possible to improve control of the progress of combustion in the engine. This information is then used to regulate the injection of fuel into each of the cylinders. In this way, pollutant emissions from the engine can be reduced and fuel consumption optimized.

In prior art glow plugs with an integrated pressure sensor, the latter is housed in a portion of the body of the glow plug called the glow plug head or mounted on the glow plug head. The latter is the portion of the body of the glow plug that is outside the cylinder. The document EP-1 096 141 discloses one such glow plug, for example.

In these glow plugs, it is necessary to transmit the pressure in the corresponding cylinder in the engine to the pressure sensor disposed outside the engine, in or on the glow plug head. Various assemblies have been described such that the forces exerted on the finger of the glow plug situated in the cylinder are retransmitted to the pressure sensor. Various mechanical parts are the inserted between the pressure sensor and the finger of the glow plug. These various intermediary parts influence the measurement effected.

Moreover, because of its position, the pressure sensor of such glow plugs is also subjected to external vibrations. Stresses in the cylinder head can also interfere with the measurements effected by the pressure sensor of such a glow plug.

The prior art glow plugs therefore have the drawback of necessitating a precise mechanical fit when assembling them, which leads to a high unit cost. Moreover, despite all the care taken with mechanical assembly, unwanted forces interfere with the measurement effected by the pressure sensor.

An aim of the present invention is thus to provide a glow plug with an integrated pressure sensor such that the latter measures the pressure inside a cylinder of an internal combustion engine as accurately as possible. The proposed solution preferably leads to no additional cost compared to the known solutions of the prior art.

To this end, the invention proposes a glow plug for an internal combustion engine cylinder including:
- a tubular body having at one end a glow plug head and a fixing area having means for fixing it into a bore,
- a finger mounted on the body of the glow plug at the end opposite the glow plug head, and
- a pressure sensor isolated in a sealed manner from the corresponding cylinder.

According to the present invention, the finger is fixed to a tubular area that is elastically deformable and adapted to project into the cylinder and the pressure sensor is mounted between the finger and a bearing part fixed to the interior of the tubular body.

In this way, the pressure sensor is located in the immediate vicinity of the finger on which the pressure in the corresponding cylinder acts. Thanks to this new location, the measurement from the pressure sensor is no longer disturbed by unwanted vibrations or stress forces caused, for example, by screwing the glow plug into the corresponding cylinder head. Moreover, it is no longer necessary to provide an accurate fit of a number of mechanical parts between the finger on which the pressure in the cylinder acts and the pressure sensor intended to measure that pressure.

The pressure sensor can be mounted directly in contact with the finger of the glow plug but an intermediate part can equally be fitted between the pressure sensor and the finger.

To obtain the most benefit from the elasticity of the tubular area, the finger is preferably fixed to the free end of the tubular area.

The finger is brazed to the tubular area, for example, by means of a ring.

In a glow plug according to the invention, the bearing part is disposed in the glow plug body, preferably near the tubular area. The pressure sensor is then in the tubular area and is not influenced at all by disturbances that may originate in the cylinder head in which the glow plug is mounted.

In one embodiment of a glow plug according to the invention the bearing part is welded to the interior of the tubular body of the glow plug.

A piezo-electric sensor is particularly suitable for use as the pressure sensor in a glow plug according to the invention.

The present invention also concerns an internal combustion engine, in particular a diesel engine, which includes a glow plug as described hereinabove.

BRIEF DESCRIPTION OF THE DRAWINGS

Details and advantages of the present invention will emerge more clearly from the following description, given with reference to the appended diagrammatic drawings, in which:

FIG. 1 shows a glow plug including a body 2, a finger 4, a core 6 and a pressure sensor 8.

DETAILED DESCRIPTION OF EMBODIMENTS

Figure 1:
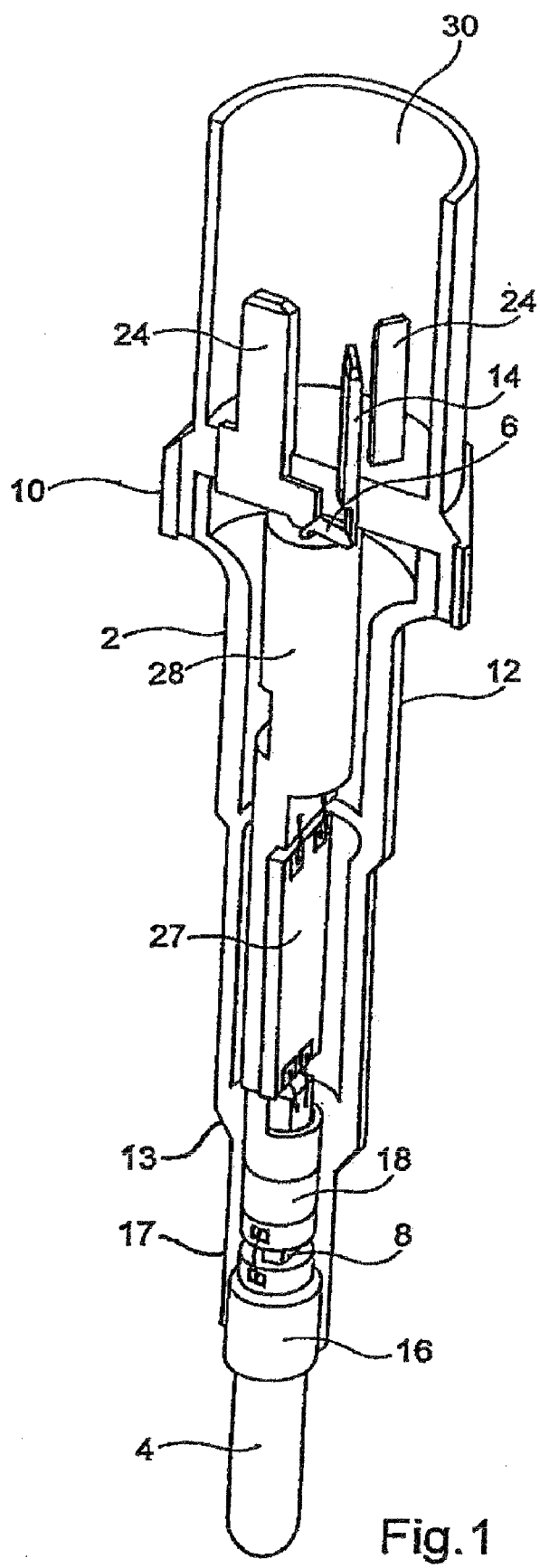
FIG. 1 represents in perspective and in partial section a glow plug according to the invention.

The body 2 is a tubular metal part consisting of a plurality of circular cylindrical segments. At a first end, called the glow plug head 10, the glow plug body 2 has a holding area with an exterior surface of hexagonal cross section. An area adjacent to the glow plug head 10 of the body 2 features a screwthread 12. The latter is intended to cooperate with a corresponding bore produced in a cylinder head of an engine in order to receive the glow plug represented in FIG. 1. The holding area of the glow plug head 10 is used for screwing the glow plug to the engine and unscrewing it therefrom.

The exterior surface of the glow plug body 2 includes a sealing cone 13 intended to cooperate with a seat of complementary shape produced in the corresponding cylinder head. The screwthread 12 and the bearing interengagement produced by the sealing cone 13 provide excellent retention of the glow plug and a perfect seal between the cylinder head and the glow plug. Thus a fixing area is defined on the glow plug body 2 including the screw thread 12 and extending as far as the sealing cone 13.

At the end opposite the glow plug head, the glow plug body 2 receives the latter's finger 4.

The finger 4 used here is a ceramic finger. It is fed with electrical current by the core 6 that passes through the whole of the glow plug body 2. A connecting terminal 14 is provided at the end of the core 6 opposite the finger 4 to enable the core, and thus also the finger, to be connected to an electrical current source.

In the FIG. 1 embodiment, the ceramic finger 4 is mounted at the end of the glow plug body 2 opposite the glow plug head 10 by means of a ring 16. The assembly of the ring 16 and the glow plug body 2 is sealed and these two parts are fastened to each other. Similarly, the finger 4 is assembled into the ring 16 so that it is fastened to the latter. These assemblies can be effected by brazing, for example.

As represented in FIG. 1, the glow plug body 2 has a terminal area 17 projecting beyond the sealing cone 13. When the glow plug is in place in the corresponding cylinder head, this terminal area 17 is located in a combustion chamber of the engine. This terminal area 17 extends the glow plug body 2 and has a tubular circular cylindrical shape. The ring 16 is welded to the free end of this terminal area 17. The height (measured along the longitudinal axis of the glow plug body 2) of the ring 16 is significantly less than the height of the terminal area 17.

The terminal area 17 can be in one piece with the body 2, as shown in FIG. 1. Having a separate part mounted on the body 2 can also be envisaged. This second solution enables a different material to be chosen for the terminal area 17 compared to the rest of the body 2, for example.

Note in FIG. 1 that the pressure sensor 8 is assembled into the body 2 of the glow plug between the finger 4 and a bearing ring 18. The latter is welded to the interior of the body 2 of the glow plug so as to be fastened to the body 2, for example. The ring 18 is substantially at the height of the sealing cone 13. Thus when the glow plug is mounted on a cylinder head, the pressure sensor 8 is located inside the combustion chamber. In fact, the sensor 8 is placed between the sealing cone 13 of the glow plug body 2 and the finger 4.

Thanks to this assembly, the pressure sensor 8 is assembled between the bearing ring 18 fastened to the body 2 and the finger 4 welded to the end of the glow plug body 2. The area of the body 2 between the ring 16 and the bearing ring 18 is an elastically deformable tubular area. Note therefore that forces exerted by the pressure inside the cylinder of the engine are retransmitted directly and completely by the finger 4 to the pressure sensor 8.

The pressure sensor 8 is a piezo-electric sensor. It comprises a piezo-electric element disposed between two contact elements (not represented) of electrically conductive material, the sensor itself being electrically insulated from the rest of the glow plug by electrically insulative elements 22.

Figure 2:
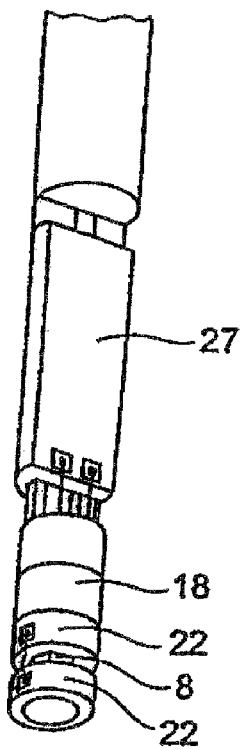
FIG. 2 shows in perspective a pressure sensor intended to be mounted in a glow plug such as that from FIG. 1.

In FIG. 1, note inside the body 2 of the glow plug a substantially circular cylindrical tubular part 28 extending from the ring 18 to the glow plug head 10. Inside this element are located the core 6 for supplying the finger 4 with power and electronic components 27 associated in particular with the pressure sensor 8. Conductive elements also connect the electronic components 27 to connecting terminals 24 located in the vicinity of the first connecting terminal 14 associated with the core 6. The electronic components 27 recover charges from the piezo-electric element and amplify them with a calibrated gain. The connecting terminals 14 and 24 are protected by a protective bush 30 (FIG. 1) made from a flexible synthetic material, for example. The assembly formed by the pressure sensor 8 and the electronic components 27 is shown in more detail in FIG. 2.

When there is a pressure inside the corresponding cylinder, that pressure exerts on the finger 4 a force tending to cause it to move into the glow plug body 2. The terminal area 17 of the glow plug body is then compressed elastically and, via the finger 4 and the ring 18, the pressure sensor 8 measures the loads linked to that deformation.

The pressure sensor assembly proposed hereinabove enables the pressure sensor to be integrated as closely as possible to the finger of the glow plug. In this way, the pressure sensor can measure directly the deformations of the heating element of the glow plug. This position of the sensor provides a more robust sensor structure and makes the sensor insensitive to vibrations.

The proposed structure, with the sensor in the region of the finger of the glow plug, or just above it, can be adapted to all known types of glow plug. Integrating the sensor into the body of the glow plug also limits the volume of the glow plug head and therefore the overall size outside the engine. Moreover, the pressure sensor 8 of the glow plug described hereinabove is insensitive to stresses in the cylinder head. Those various stresses therefore do not influence the measurement effected by this sensor.

The pressure sensor is also isolated from particles and other impurities in the corresponding combustion chamber. The connection between the end 16 and the finger 4 is perfectly sealed and therefore prevents any migration of particles toward the pressure sensor.

In the embodiment proposed hereinabove, the pressure sensor is highly insensitive to vibrations and other unwanted forces. The resonant frequency of such an assembly is in fact greater than 12 kHz.

The proposed pressure sensor assembly guarantees high stability of the pressure sensor.

The pressure measurement effected is preferably independent of temperature. To this end, there is preferably chosen for producing the terminal area 17 an alloy whose elasticity does not vary in the ranges of temperature to which the terminal area 17 is subjected.

Similarly, the piezo-electric element is chosen so that its sensitivity is independent of temperature. To withstand the relatively high temperatures to which the pressure sensor is subjected, the piezo-electric element takes the form of a monocrystal, for example. It is nevertheless equally possible to use polycrystals having a high Curie temperature, for example greater than 500° C.

Note also the high degree of integration of the glow plugs according to the invention described hereinabove. In fact, electronic components can be integrated into the core of this glow plug. Although having significantly improved performance in terms of pressure measurement compared to the glow plugs provided with a pressure sensor of the prior art, the solution proposed by the invention does not lead to any additional cost compared to similar glow plugs of the prior art.

Finally, thanks to the seals provided, there is no risk of contamination of the pressure sensor by particles in the corresponding cylinder.

The present invention is not limited to the embodiment described hereinabove by way of nonlimiting example. It also concerns all variants evident to the person skilled in the art.

The invention claimed is:

1. A glow plug for an internal combustion engine cylinder including:
   a tubular body having at one end a glow plug head and a fixing area having means for fixing into a bore,
   a finger mounted on the body of the glow plug at the end opposite the glow plug head, and
   a pressure sensor isolated in a sealed manner from the corresponding cylinder,
   wherein the finger is fixed to a tubular area by an intermediate support structure, said tubular area being elastically deformable and adapted to project into the cylinder and wherein the pressure sensor is mounted between the finger and a bearing part fixed to the interior of the tubular body.

2. The glow plug according to claim 1, wherein the finger is fixed to a free end of the tubular area.

3. The glow plug according to claim 1, wherein the intermediate support structure is a ring brazed to the tubular area.

4. The glow plug according to claim 1, wherein the bearing part is disposed in the glow plug body near the tubular area.

5. The glow plug according to claim 1, wherein the bearing part is welded to the interior of the tubular body of the glow plug.

6. The glow plug according to claim 1, wherein the pressure sensor is a piezo-electric sensor.

7. The glow plug according to claim 6, wherein the piezo-electric sensor includes a piezo-electric element taking the form of polycrystals and whose Curie temperature is greater than 500° C.

8. Internal combustion engine, in particular diesel engine, characterized in that it includes a glow plug according to claim 1.

9. The glow plug according to claim 2, wherein the finger is brazed to the tubular area by means of a ring.

10. The glow plug according to claim 2, wherein the bearing part is disposed in the glow plug body near the tubular area.

11. The glow plug according to claim 3, wherein the bearing part is disposed in the glow plug body near the tubular area.

12. The glow plug according to claim 2, wherein the bearing part is welded to the interior of the tubular body of the glow plug.

13. The glow plug according to claim 3, wherein the bearing part is welded to the interior of the tubular body of the glow plug.

14. The glow plug according to claim 2, wherein the pressure sensor is a piezo-electric sensor.

15. The glow plug according to claim 3, wherein the pressure sensor is a piezo-electric sensor.

16. The glow plug according to claim 1, wherein the bearing part is fixed to the body in the vicinity of a sealing cone.

17. The glow plug according to claim 1, wherein the pressure sensor is arranged between the finger and a sealing cone of the body.

18. The glow plug according to claim 1, wherein the body has a sealing cone and wherein the pressure sensor is arranged under the sealing cone.

* * * * *